(12) United States Patent
Weissman et al.

(10) Patent No.: US 9,378,392 B2
(45) Date of Patent: *Jun. 28, 2016

(54) METHODS AND SYSTEMS FOR CONTROLLING ACCESS TO CUSTOM OBJECTS IN A DATABASE

(71) Applicant: salesforce.com, inc., San Francisco, CA (US)

(72) Inventors: Craig Weissman, San Francisco, CA (US); Kevin Oliver, San Francisco, CA (US); Benji Jasik, San Francisco, CA (US); Kedar Doshi, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/042,514

(22) Filed: Sep. 30, 2013

(65) Prior Publication Data

US 2014/0095545 A1    Apr. 3, 2014

Related U.S. Application Data

(63) Continuation of application No. 13/346,622, filed on Jan. 9, 2012, now Pat. No. 8,548,982, which is a continuation of application No. 11/866,184, filed on Oct. 2, 2007, now Pat. No. 8,095,531.

(60) Provisional application No. 60/828,019, filed on Oct. 3, 2006.

(51) Int. Cl.
*G06F 7/00*  (2006.01)
*G06F 17/30* (2006.01)
*G06F 21/62* (2013.01)

(52) U.S. Cl.
CPC ...... *G06F 21/6227* (2013.01); *G06F 17/30165* (2013.01); *Y10S 707/99933* (2013.01); *Y10S 707/99939* (2013.01)

(58) Field of Classification Search
CPC .............. G06F 17/30463; G06F 17/30864; G06F 17/30867; G06F 17/30442; G06F 17/30595; G06F 17/3028; G06F 17/30604; G06F 17/30165
See application file for complete search history.

(56) References Cited

U.S. PATENT DOCUMENTS 5,544,355 A   8/1996   Chaudhuri et al.
5,577,188 A   11/1996  Zhu
5,584,224 A   12/1996  Davies et al.

(Continued)

OTHER PUBLICATIONS

International Search Report, Application No. PCT/US07/80266, mailed Jun. 17, 2008.

*Primary Examiner* — James Trujillo
*Assistant Examiner* — Jessica N Le
(74) *Attorney, Agent, or Firm* — Haynes Beffel & Wolfeld LLP; Ernest J. Beffel, Jr.

(57) ABSTRACT

In embodiments, methods and systems for controlling access to custom objects are provided. These techniques for controlling access to custom objects can enable embodiments to utilize a key for the protection of the security of data that is to remain private while not compromising efficiency of a query. The key for a requested custom object is identified and then used so that only an appropriate portion of a custom entity share table is searched to locate access information. It is then determined whether the user can access at least a portion of the custom object, and the appropriate and allowed data is sent to the user.

19 Claims, 7 Drawing Sheets

(56) References Cited

U.S. PATENT DOCUMENTS

| | | | |
|---|---|---|---|
| 5,608,872 A | 3/1997 | Schwartz et al. |
| 5,649,104 A | 7/1997 | Carleton et al. |
| 5,701,453 A | 12/1997 | Maloney et al. |
| 5,715,450 A | 2/1998 | Ambrose et al. |
| 5,751,949 A | 5/1998 | Thomson et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,893,077 A | 4/1999 | Griffin |
| 5,918,159 A | 6/1999 | Fomukong et al. |
| 5,918,224 A | 6/1999 | Bredenberg |
| 5,937,401 A | 8/1999 | Hillegas |
| 5,937,402 A | 8/1999 | Pandit |
| 5,940,818 A | 8/1999 | Malloy et al. |
| 5,963,953 A | 10/1999 | Cram et al. |
| 5,991,754 A | 11/1999 | Raitto et al. |
| 6,092,062 A | 7/2000 | Lohman et al. |
| 6,092,083 A | 7/2000 | Brodersen et al. |
| 6,134,540 A | 10/2000 | Carey et al. |
| 6,161,149 A | 12/2000 | Achacoso et al. |
| 6,169,534 B1 | 1/2001 | Raffel et al. |
| 6,169,993 B1 | 1/2001 | Shutt et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,236,996 B1 | 5/2001 | Bapat et al. |
| 6,266,669 B1 | 7/2001 | Brodersen et al. |
| 6,275,824 B1 | 8/2001 | O'Flaherty et al. |
| 6,275,825 B1 | 8/2001 | Kobayashi et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,363,371 B1 | 3/2002 | Chaudhuri et al. |
| 6,367,077 B1 | 4/2002 | Brodersen et al. |
| 6,393,605 B1 | 5/2002 | Loomans |
| 6,405,209 B2 | 6/2002 | Obendorf |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,529,901 B1 | 3/2003 | Chaudhuri et al. |
| 6,535,909 B1 | 3/2003 | Rust |
| 6,549,908 B1 | 4/2003 | Loomans |
| 6,550,057 B1 | 4/2003 | Bowman-Amuah |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,587,854 B1 | 7/2003 | Guthrie et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 * | 5/2004 | Brodersen et al. |
| 6,732,111 B2 | 5/2004 | Brodersen et al. |
| 6,754,681 B2 | 6/2004 | Brodersen et al. |
| 6,757,805 B2 | 6/2004 | Wu |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,823,384 B1 | 11/2004 | Wilson et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,988,109 B2 | 1/2006 | Stanley et al. |
| 7,062,502 B1 | 6/2006 | Kesler |
| 7,069,231 B1 | 6/2006 | Cinarkaya et al. |
| 7,069,497 B1 | 6/2006 | Desai |
| 7,096,216 B2 | 8/2006 | Anonsen |
| 7,127,461 B1 | 10/2006 | Zhu et al. |
| 7,171,413 B2 | 1/2007 | Puz et al. |
| 7,181,758 B1 | 2/2007 | Chan |
| 7,216,125 B2 | 5/2007 | Goodwin |
| 7,289,976 B2 | 10/2007 | Kihneman et al. |
| 7,340,411 B2 | 3/2008 | Cook |
| 7,346,617 B2 | 3/2008 | Wong |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,529,728 B2 | 5/2009 | Weissman et al. |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,039 B2 * | 8/2010 | Weissman et al. ............ 707/793 |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,211 B2 | 9/2011 | Marceau et al. |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,078,597 B2 | 12/2011 | Polk et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,112,459 B2 | 2/2012 | Dettinger et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,543,566 B2 | 9/2013 | Weissman et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0052862 A1 * | 5/2002 | Scott et al. ...................... 707/1 |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0156756 A1 | 10/2002 | Stanley et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0009446 A1 | 1/2003 | Agarwal et al. |
| 2003/0014394 A1 | 1/2003 | Fujiwara et al. |
| 2003/0018705 A1 | 1/2003 | Chen et al. |
| 2003/0018830 A1 | 1/2003 | Chen et al. |
| 2003/0065648 A1 | 4/2003 | Driesch et al. |
| 2003/0066031 A1 | 4/2003 | Laane |
| 2003/0066032 A1 | 4/2003 | Ramachandran et al. |
| 2003/0069902 A1 * | 4/2003 | Narang et al. ................ 707/203 |
| 2003/0069936 A1 | 4/2003 | Warner et al. |
| 2003/0070000 A1 | 4/2003 | Coker et al. |

(56) References Cited

U.S. PATENT DOCUMENTS

| | | |
|---|---|---|
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0154197 A1 | 8/2003 | Millet et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0019587 A1 | 1/2004 | Fuh et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0044426 A1 | 2/2005 | Vogel et al. |
| 2005/0050041 A1 | 3/2005 | Galindo-Legaria et al. |
| 2005/0050046 A1 | 3/2005 | Puz et al. |
| 2005/0050555 A1 | 3/2005 | Exley et al. |
| 2005/0065925 A1* | 3/2005 | Weissman et al. ............ 707/4 |
| 2005/0071345 A1 | 3/2005 | Lin |
| 2005/0091098 A1 | 4/2005 | Brodersen et al. |
| 2005/0097097 A1 | 5/2005 | Hunt et al. |
| 2005/0283478 A1 | 12/2005 | Choi et al. |
| 2006/0021019 A1 | 1/2006 | Hinton et al. |
| 2006/0036576 A1 | 2/2006 | Simmen |
| 2006/0116976 A1 | 6/2006 | Legault et al. |
| 2006/0230124 A1 | 10/2006 | Belfiore et al. |
| 2006/0282328 A1* | 12/2006 | Gerace et al. ............... 705/14 |
| 2006/0294088 A1 | 12/2006 | Stecher et al. |
| 2007/0073695 A1* | 3/2007 | Conlan et al. ............... 707/9 |
| 2007/0077978 A1 | 4/2007 | Walker et al. |
| 2007/0124276 A1 | 5/2007 | Weissman et al. |
| 2007/0130117 A1 | 6/2007 | Lapstun et al. |
| 2007/0156650 A1 | 7/2007 | Becker |
| 2007/0156700 A1* | 7/2007 | Becker ............... 707/10 |
| 2007/0162969 A1 | 7/2007 | Becker |
| 2007/0198597 A1 | 8/2007 | Betz et al. |
| 2007/0214145 A1* | 9/2007 | Subramaniam et al. ....... 707/10 |
| 2007/0244849 A1* | 10/2007 | Predovic ............... 707/2 |
| 2007/0255715 A1 | 11/2007 | Li et al. |
| 2008/0010233 A1 | 1/2008 | Sack et al. |
| 2008/0065925 A1* | 3/2008 | Oliverio et al. ............ 713/401 |
| 2008/0082540 A1 | 4/2008 | Weissman et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0150968 A1 | 6/2009 | Ozzie et al. |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |
| 2014/0095545 A1 | 4/2014 | Weissman et al. |

* cited by examiner

*FIG. 3*

| Org id | acc id | name | data 203 ........ | User ID Ownership |
|---|---|---|---|---|
| ood 1 | ood 1 | Enterprise Constellation | | |
| ood 1 | ood 2 | | | |
| ood 1 | | | | |
| ood 2 | ood 2 | | | |
| ood 2 | ood 2 | | | |
| ood 2 | | | | |
| .... | .... | .... | .... | .... |
| oodN | | | | |
| oodN | | | | |

201 (.account) 202 org #1, org #2, org #N

200

METHODS AND SYSTEMS FOR CONTROLLING ACCESS TO CUSTOM OBJECTS IN A DATABASE

CLAIM OF PRIORITY

This application is a continuation of U.S. patent application Ser. No. 13/346,622, entitled "METHODS AND SYSTEMS FOR CONTROLLING ACCESS TO CUSTOM OBJECTS IN A DATABASE," by Craig Weissman et al., filed 9 Jan. 2012, which issued as U.S. Pat. No. 8,548,982 on 1 Oct. 2013, which is a continuation of U.S. patent application Ser. No. 11/866,184, entitled "METHODS AND SYSTEMS FOR CONTROLLING ACCESS TO CUSTOM OBJECTS IN A DATABASE," by Craig Weissman et al., filed 2 Oct. 2007, which issued as U.S. Pat. No. 8,095,531 on 10 Jan. 2012, which claims the benefit of U.S. Provisional Patent Application No. 60/828,019 entitled "METHODS AND SYSTEMS FOR CONTROLLING ACCESS TO CUSTOM OBJECTS IN A DATABASE," by Craig Weissman et al., filed 3 Oct. 2006. The priority applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

The following commonly owned, co-pending United States Patents and Patent Applications, including the present application, are related to each other. Each of the other patents/applications are incorporated by reference herein in its entirety:

U.S. patent application Ser. No. 10/669,523 entitled "QUERY OPTIMIZATION IN A MULTI-TENANT DATABASE SYSTEM," by Craig Weissman et al., filed Sep. 23, 2003;

U.S. patent application Ser. No. 11/558,761 entitled "METHOD OF IMPROVING A QUERY TO A DATABASE SYSTEM," by Craig Weissman et al., filed Nov. 11, 2006; and U.S. patent application Ser. No. 10/817,161 entitled "CUSTOM ENTITIES AND FIELDS IN A MULTI-TENANT DATABASE SYSTEM," by Craig Weissman et al., filed Apr. 2, 2004.

FIELD OF THE INVENTION

The current invention relates generally to controlling access to objects in a database, and more particularly to controlling access to custom objects in an on-demand database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid and efficient retrieval of accurate information and subsequent delivery of this information to the user system in a transparent manner that is easy to understand is desirable.

Unfortunately, conventional database approaches might allow private data to be accessible to unauthorized persons if, for example, an unauthorized person is able to submit any query and to see all of the results of such a query. This can become particularly troublesome when an organization using a database, which is also used by other organizations, can freely define custom objects and the access rights to the custom objects.

Accordingly, it is desirable to provide techniques enabling the controlling of access to custom objects of the database system and/or optimizing a query to a custom object to improve performance and security of the database system.

BRIEF SUMMARY OF THE INVENTION

In accordance with embodiments, there are provided mechanisms and methods for controlling access to custom objects. These mechanisms and methods for controlling access to custom objects can enable embodiments to utilize a key for the protection of the security of data that is to remain private while not compromising efficiency of a query. The key for a requested custom object is identified and then used so that only an appropriate portion of a custom entity share table is. searched to locate access information. It is then determined whether the user can access at least a portion of the custom object, and the appropriate and allowed data is sent to the user.

In an embodiment and by way of example, a method for controlling access to custom objects in a database is provided. The database stores data specific to each one of a plurality of tenants such that at least two of the tenants store at least a portion of data specific to the at least two tenants in a common table within the database. Each tenant is permitted access only to data associated with that tenant, where each tenant has one or more users.

A user associated with a first tenant receives a request to access data of a first custom object in the database. The common table includes at least two custom objects associated with the first tenant. The at least two custom objects each contain one or more data types specified by the first tenant. A key associated with the first custom object is identified. Only that portion of a custom entity share table appropriate to the key is searched to locate access information for the first custom object. Based at least in part on the access information, it is determined whether the user has permission to access at least a portion of the custom object. The requested data of the first custom object to which the user has permission to access is sent to the user.

Other embodiments of the invention are directed to systems and computer readable media associated with methods described herein, as well as methods for transmitting program code for creating the computer readable medium and/or for performing methods described herein.

While the present invention is described with reference to an embodiment in which techniques for controlling access to custom objects in an on-demand service environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

In the following drawings, like reference numbers indicate identical or functionally similar elements. Although the following figures depict various examples of the invention, the invention is not limited to the examples depicted in the figures.

FIG. 3 illustrates an example of objects represented as a main table in an embodiment.

DETAILED DESCRIPTION OF THE INVENTION

General Overview

Systems and methods are provided for controlling access to custom objects in a database system. These techniques for controlling access to custom objects can enable embodiments to utilize a key for the protection of the security of data that is to remain private while not compromising efficiency of a query.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing controlling access to custom objects in a database system will be described with reference to example embodiments.

System Overview

Figure 1:
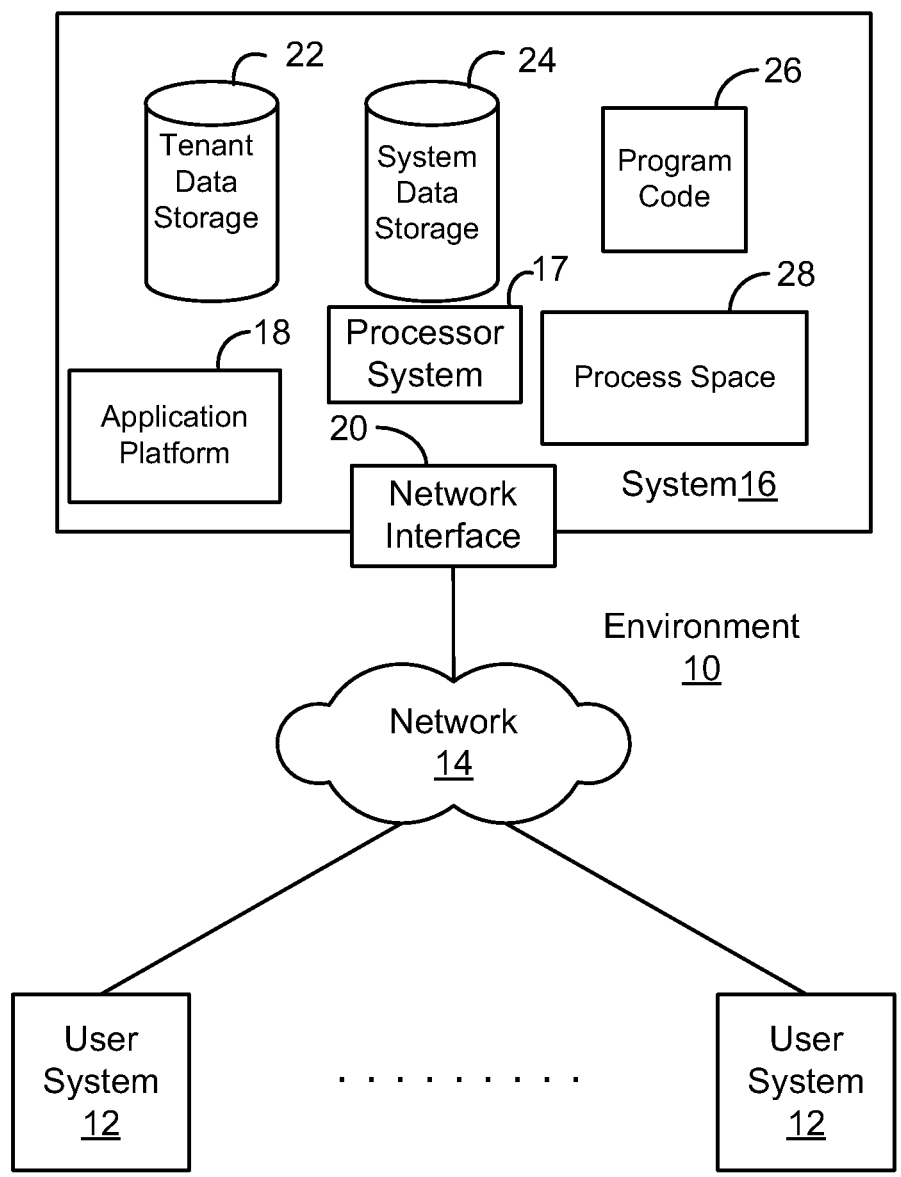
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data 25 storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be anyone or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCPIIP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which mayor may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCPIIP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
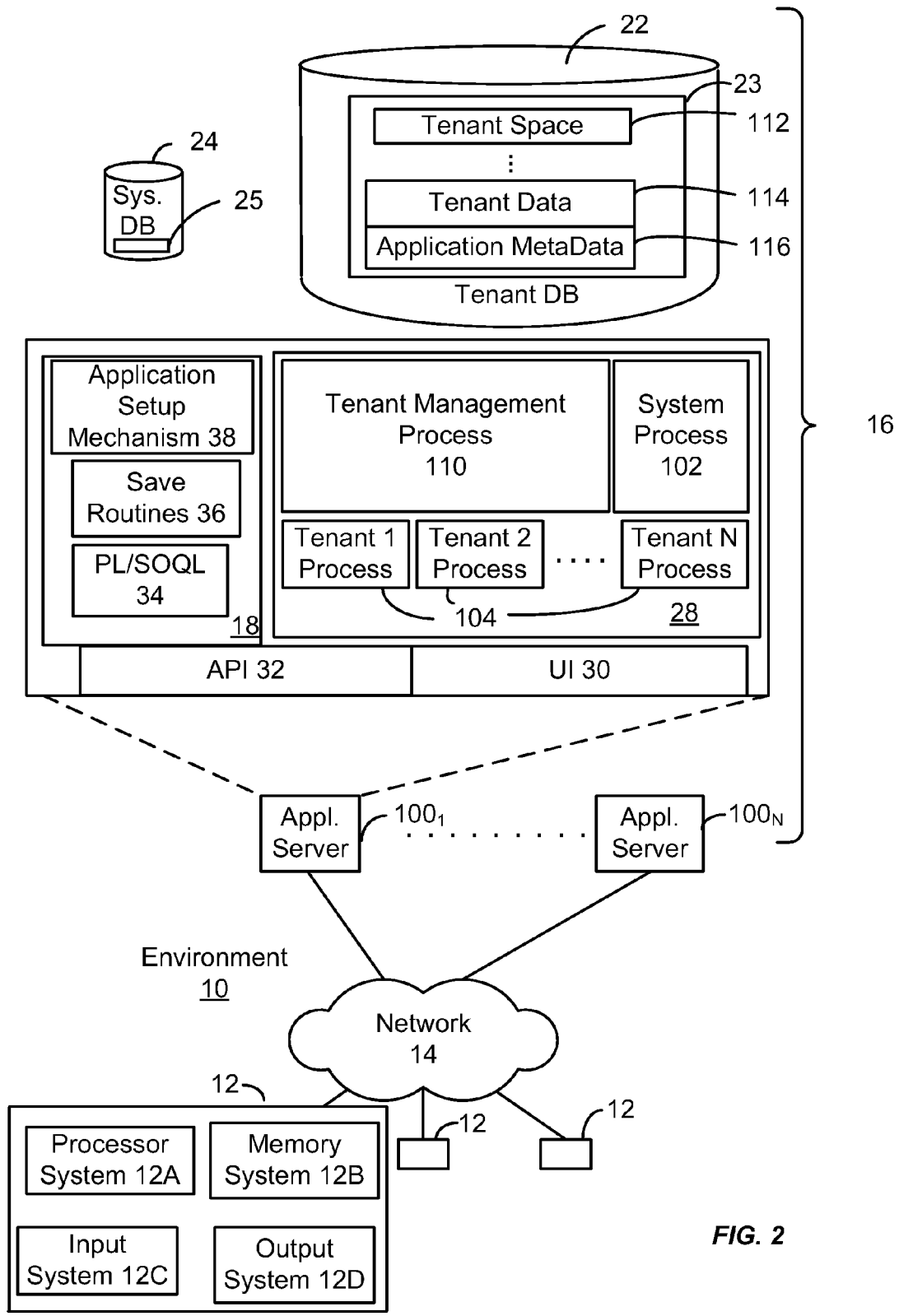
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100₁-100N, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCPIIP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

FIG. 3 illustrates an example of objects represented as a main table 200 in an embodiment. In the specific example shown in FIG. 3, the main table 200 (.account) represents a standard Account entity. As shown, main table 200 includes an organization ID ("org id") column 201 and a table ID (e.g., "acc id" for .account id) column 202 that acts as the primary key for table 200. Data table 200 also includes a plurality of pre-defined data columns 203, such as name, a site, a number of employees and others as would be useful for storing account-related information. Data table 200 may also include column 209 [add number to diagram] that stores the user ID of the user that owns or created the specific account that is stored in that row.

The org id column 201 is provided to distinguish among organizations using the multi-tenant account table 200. As shown, N different organizations have data stored in table 200. The org ids in column 201 are defined as Char(15) in an example implementation, but may include other data types. In one aspect, the first 3 characters of the org id is set to a predefined prefix, such as "00d", although another subset of characters in the org id may be used to hold such a prefix if desired.

Custom Objects

An organization using the standard entities provided by the system may desire that one or more new entities be created to specifically cater to, and to facilitate data storage and retrieval for, that organization's particular business model. Accordingly, in some multi-tenant database systems, tenants may be allowed to create and store custom objects. U.S. Patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 4:
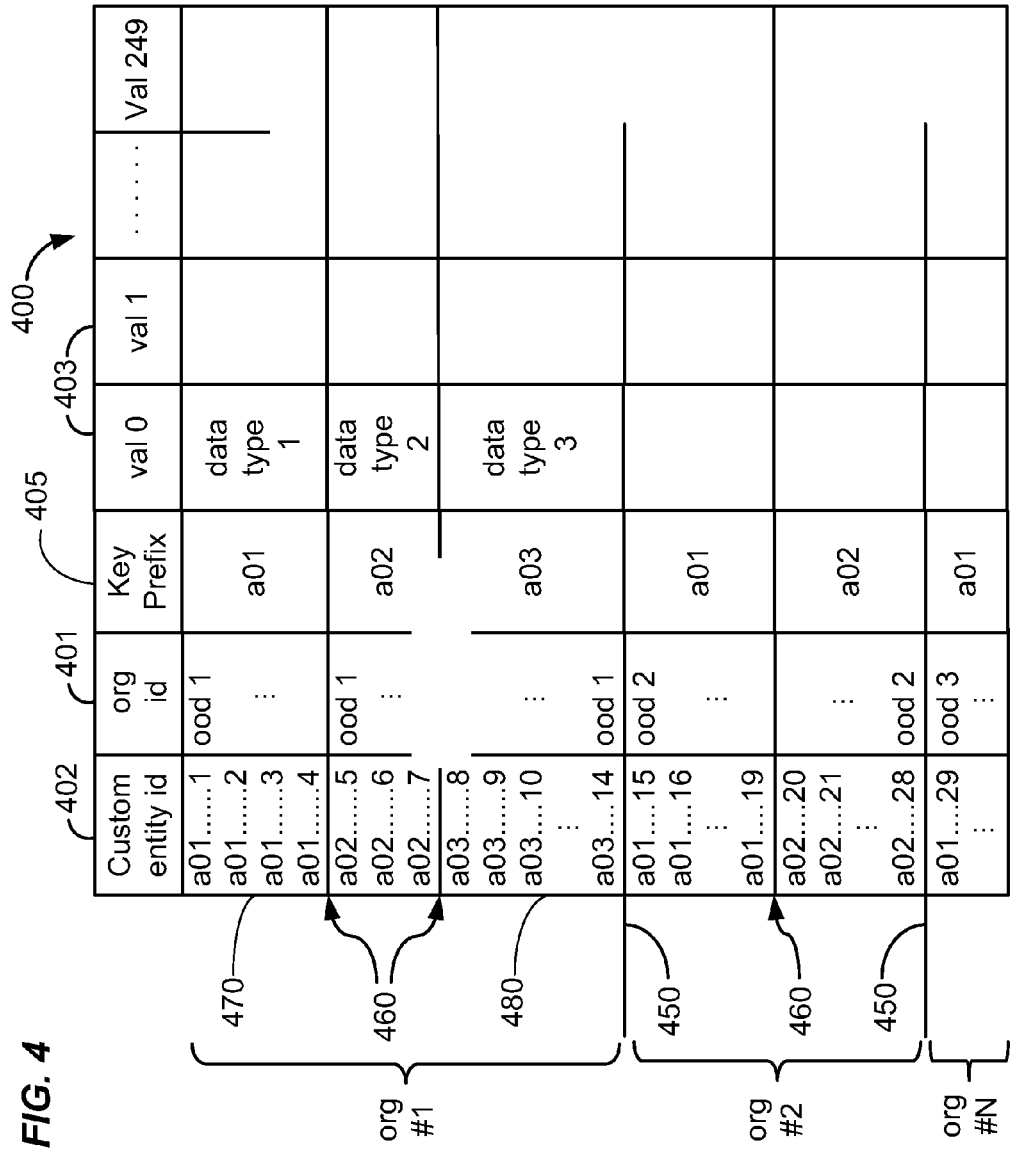
FIG. 4 illustrates an example of a custom object represented as a custom entity table 400 in an embodiment.

FIG. 4 illustrates an example of a custom object represented as a custom entity table 400 in an embodiment. Table 400 includes an org id column 401, a custom entity id column 402 and a plurality of custom field columns 403 (labeled "val0", "val1", . . . ). At least one of the custom field columns 403 has a data type defined (specified) by the organization associated with the custom entity. In one embodiment, all of the data types are defined by the associated organization. In another embodiment, some of the columns may be use default data types.

The org id column is used to distinguish among the various organizations populating table 400. For example, multiple organizations may create custom entities, all of which are stored to table 400 in one aspect. Custom entity id column 402 is used to distinguish among the various custom entity tables stored in table 400. Custom entity id column 402 also acts as the primary key column for table 400. Custom field columns 403 are used to store the data for the various custom entities defined by the various organizations. Specifically, custom field columns 403 store the columns defined for each of the various custom entities defined by the various organizations populating table 400.

According to one embodiment, the first 3 characters of the globally unique primary key field 402 are used to identify the specific entity type. This technique advantageously allows for multiple custom entity types for one organization to be distinguished in this one custom entity table 400 as will be discussed below. It will be appreciated, however, that fewer or more than the first 3 characters of the primary key may be used to identify entities, or that any subcombination of characters of the primary key may be used.

Figure 5:
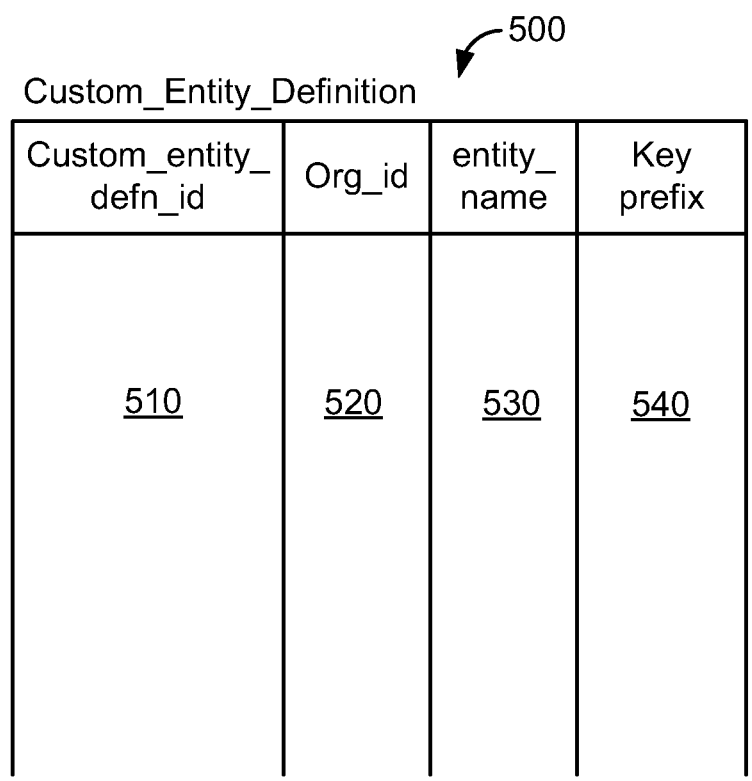
FIG. 5 illustrates a metadata table used to record the name and other information for each custom entity object defined for each organization in an embodiment.

When an organization administrator defines a new custom entity, the definition is stored in the metadata instead of the underlying data dictionary. FIG. 5 illustrates an example of a custom entity definition metadata table 500 ("custom_entity_definition") according to an embodiment of the present invention. When a new custom entity is defined, the database system allocates a unique (within that organization) 3-character prefix for rows of that entity type. In one aspect, the letter 'a' is chosen as the first character of all custom entity primary keys, e.g., a01 . . . a02 . . . a03 . . . aMN . . . as shown in column 402 of table 400. As shown, across all organizations the same 3-character prefix may be re-used. For example, "a01" is reused as a prefix for multiple organizations. However, the remainder of the custom entity id ensures global uniqueness (and that data from different organizations is never mingled). In one embodiment, this 3-character prefix is used in a separate column 405 such that the table 400 may be filtered based on values in that column.

Referring to FIG. 5, custom entity definition metadata table 500 is used to record the name and other information for each custom entity object defined for each organization. As shown, metadata table 500 includes custom_entity_definition_id column 510, organization_id column 520, entity_name column 530, and key prefix column 540. Organization_id column 520 stores the org id of the organization for which the custom entity is created, and the custom_entity_definition_id column 510 is the primary key for table 500. Entity name column 530 stores the names of the custom entity table, e.g., as a text datatype. Key prefix column 540 stores the 3-character prefix (e.g., "a01", "a02", etc.) allocated for rows of that entity type.

When creating a custom entity table, the administrator for an organization specifies a unique (within the organization) developer name for the custom entity—this is the name used to identify that particular entity for API calls and other developer entry points into the system. This name is stored in the entity name column 530 of table 500. Custom fields may also be defined for custom entities, and where desired, custom fields may be flagged for indexing, as described above. Once custom fields are defined for the custom entity, the organization can begin to use that custom entity like any other standard entity. For example, all API operations (e.g., describe, insert, update, delete, query, search) are available and the organization may define a user interface for editing that custom entity in an online application. Transparent to the users and organization, however, the custom entity table is stored in a single custom entity table 400 along with other custom entity tables defined by that organization as well as other organizations.

One difference in terms of SQL when operating on a custom entity table is the need to filter on the custom entity id in addition to the organization id to ensure that the data from multiple logical entity types within one organization are not mixed together. For example, the leading 3-character portion of the primary key index (e.g., a01 . . . aMN) can be used for this efficient filtering. Thus, filtering on the organization id and the 3-character prefix provides a determination of a specific entity type for the organization. Similarly, an insert PL/SQL call should be told which 3-character prefix to use when inserting a new primary key value and custom entity row. For the sake of simplicity, row partitions are not shown in table 400, however organization partitions 450 and entity partitions 460 are shown.

Even after a custom object has been identified and filtered, it may be advantageous to identify the access rights associated with the of the custom object.

Controlling Access to Custom Objects

A user associated with a first tenant may not have access rights to view certain objects or specific entries (such as rows) of an object, as well as the objects of another tenant. For example, a user may have access rights to a custom object 470, but not have access rights to a custom object 480. If it is known which objects or rows of objects that a user can see, then optimizations may be made to return the result of a query by that user much more efficiently, while still ensuring that unauthorized users cannot see certain data.

Regarding access rights, a private sharing feature or rules may allow groups defined within a particular tenant{s) to share information only among members of that group provided in certain embodiments. Sharing rules are a way of granting access to a set of entities (the source), to a set of users (the target). In one aspect, the source set is a logical set of entities defined by picking a group. The source then contains all entities owned or with access rights by users in the group. In one aspect, sharing rules also specify an access level for each entity.

In one embodiment, access relationships calculated (from sharing rules or implicit relationships) or explicitly defined are persisted in records for efficiency. These records, e.g. custom share table 600 and related tables, may contain the entity, the user or groups it's shared to, an access level and a cause to track the origin of the record.

This private sharing feature allows a specific list of users to have access to privileged data, for example, such as specific accounts or opportunities. It is noteworthy that not all tenants will elect to enable private sharing for their implementations. Some tenants will elect public sharing paradigm instead. In a public sharing implementation, each user associated with a tenant sees every data row within the tenant's organization. Sharing tables, such as the custom entity share table, e.g. 600 of FIG. 6, for example are populated for private sharing implementations only and are joined in queries made by organizations using private sharing.

Figure 6:
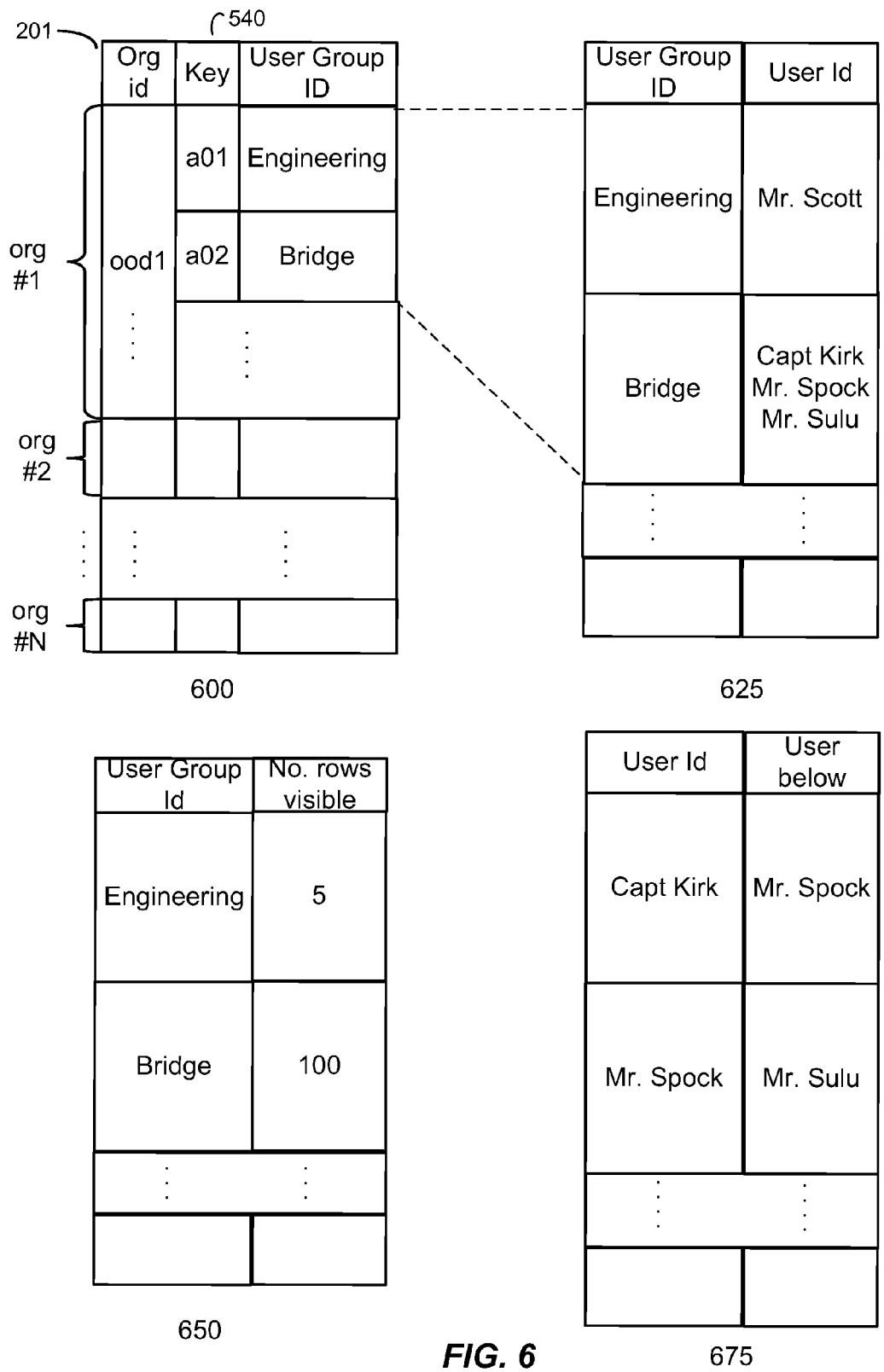
FIG. 6 illustrates an example custom entity share table capable of storing sharing information in an embodiment.

Custom entity share table 600 of FIG. 6 illustrates an example storage mechanism for storing information by a tenant using a private sharing mechanism provided by an embodiment. It is noteworthy that table 600 is merely an illustrative example of one private sharing implementation and is not intended to limit embodiments to sharing only specific types or quantities of information. The table 600 specifies that a user or group of users has access to a particular custom entity or a particular row of that entity. In one aspect, table 600 has a column for account id as well. In the example table 600 illustrated by FIG. 6, a particular organization assigned org id "oodl" has at least two user group IDs, "Engineering" and "Bridge" defined. The "Engineering" group can see the first custom entity and the "Bridge" group can see the second custom entity.

Groups are a convenient way to specify a set of users. Groups can be explicitly specified or implicitly created. These groups can be hierarchical, that is, user groups (child groups) can be a member of another group (parent group). The set of users in a group is the all the users in the group and its child groups. In one embodiment, this information is maintained in the blowout table 675 for efficiency. The blowout table 675 may also include one or more columns or group entries in the user id column for child groups. Blowout table 675 or a similar table can contain other user-to-user relationships, such as the hierarchal relationships of table 675. In one embodiment, group membership is maintained in table 625 in order to evaluate entity access for users and groups with the same database query.

The table 600 also has a column for the key prefix 540, for each custom entity of organization #1. Thus, in one embodiment, custom entities share a single rule table partitioned by their key. The first custom object is identified with "a01" and the second custom object with "a02." The user group ID column shows which groups have access to a particular custom object. The user group ID column can also name specific users.

In the embodiment shown, only one group has access to each of the custom objects. In other embodiments, the User Group ID may contain multiple entries, i.e. multiple groups may have access to a certain custom object.

In one embodiment, the existence of a user group ID in table 600 signifies that a group can see all of the rows of an associated custom object. For example, the "Engineering" group can see all of the rows of the custom object "a01". In another embodiment, the existence of a user group ID in table 600 means that the group can see at least one row, but not necessarily all of the rows of the custom object. Table 600 may also contain access information for each row of a custom entity or this may be available in another table specific to that custom entity.

Access relationship data may be created synchronously with updates to the dependent data (group membership, sharing rules or updates to the entity) or can be deferred for later depending on processing time. Any information intended for the access relationship table deemed to be trivial because of clients default settings for their organizations need not be maintained for efficiency.

In addition to the standard sharing rules, in one aspect custom entities are defined to have master/detail relationships with other (standard and custom) entities. Child custom entities in this relationship do not have an owner. Instead, child entities dynamically inherit sharing access from that defined on their parent entity. If however, the child is detached from its parent, it becomes a standalone entity with its own owner and sharing access.

Figure 7:
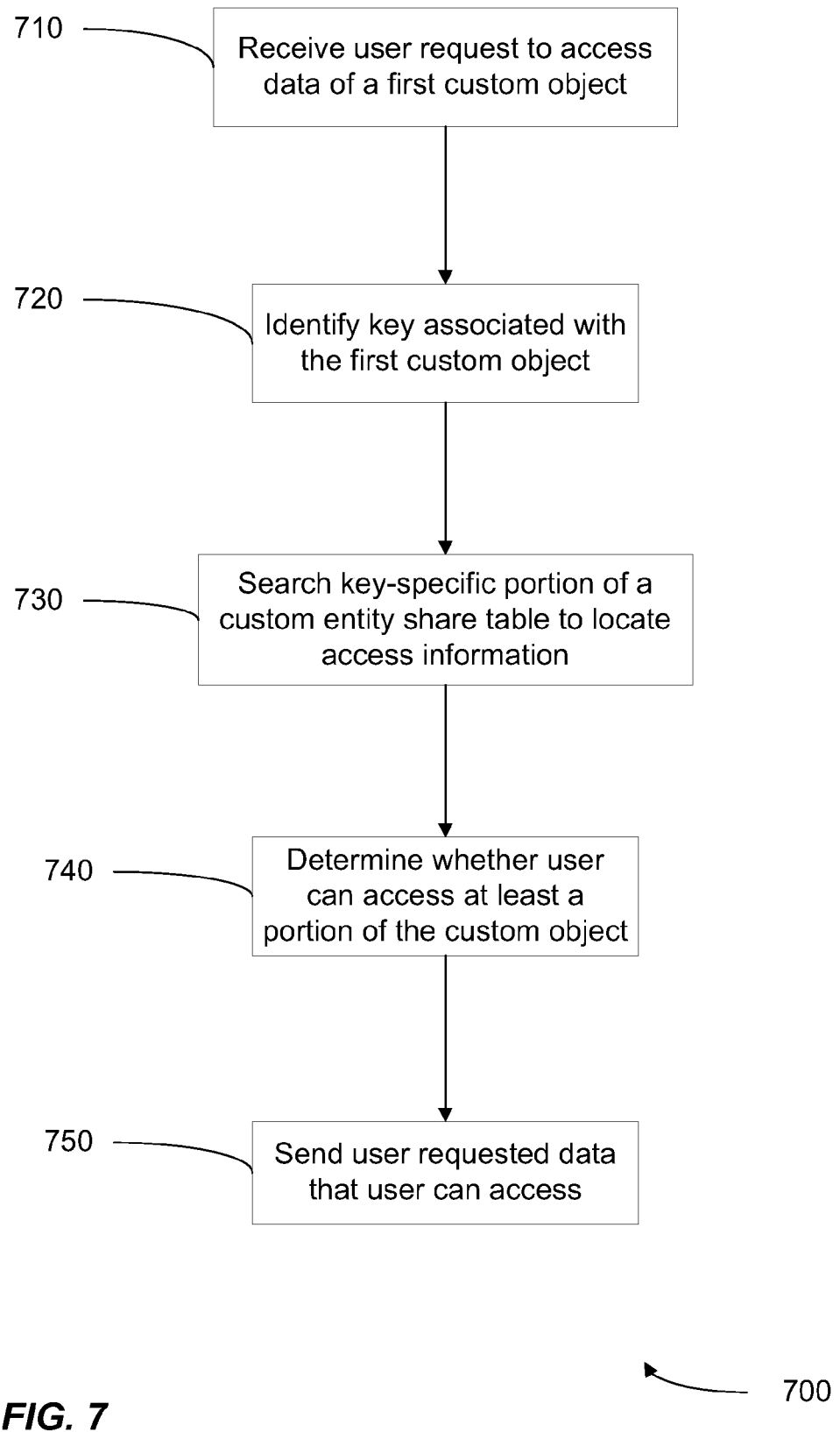
FIG. 7 is a flowchart of a method for controlling access to a custom object in an embodiment.

FIG. 7 is a flowchart of a method 700 for controlling access to a custom object in an embodiment. In step 710, a request to access a first custom object (e.g. custom object 470) is received from a user associated with a first tenant (e.g. organization with org id of "oodl" from FIG. 4). In one embodiment, the request is received by system 16 and steps of method 700 are performed by elements of system 16. As shown in FIG. 4, the first tenant has at least two custom objects with data types specified by the first tenant. In one embodiment, the request contains the first custom object's name, which is used to identify that particular entity for API calls and other developer entry points into the system.

Thus, in one embodiment, table 400 is a database common table that stores data of multiple tenants, where each tenant is permitted access only to data associated with that tenant (e.g. data that has the same org id as the tenant). In another embodiment, the common table may be a mixed standard and custom entity table. The mixed table would be able to accommodate standard entities as well as custom entities.

In step 720, a key associated with the first custom object is identified. In one embodiment, the key is identified by searching the custom entity definition table 500 to identify the key prefix 540 that corresponds to the custom object. In another embodiment, the request contains the key, and thus the key would be identified in the request itself.

In step 730, only that portion of a custom entity share table (e.g. table 600) appropriate to the key is searched to locate information useful to determine if the user is permitted to access the first custom object. In one embodiment, the information includes the user group or users that are identified in the User group ID column of table 600 as having access rights to the custom object with the identified key. In one aspect, the custom entity share table includes access information for each custom object of the first tenant.

In one embodiment, the information may be obtained by starting a search in the custom entity share table from the left using a filter on the key prefix. In another embodiment, the search may be started form the right using a filter on the user an/or groups that the user belongs, or users below the requesting user. This may be done, for example, if there are requested data for many custom entities contained within the user's request.

In step 740, it is determined whether the user can access at least a portion of the custom object based on the useful information. A user may have access rights to all of the rows of a custom object or it may only have access to some of the rows. Additional information may be obtained to make this determination, along with a query plan to make the determination.

In step 750, the requested data of the first custom object to which the user can access is sent to the user. The requested data may be the result of a query with filter predicates that provide a selection of the data desired. The efficiency of the query can be benefited with additional access rights information, which may be statistical in nature.

Optimizing Query of Custom Objects

A query may be optimized using the access rights information as follows. When displaying a list of all rows that the current user can see (possibly with a filter on the entity rows, such as the name of the account or the dollar amount of the opportunity) the query optimizer will choose between accessing the custom entity share table 600 from the user side (i.e., Engineering or Bridge) or the entity side (i.e., "oodl" and/or "a01") of the relationship.

If an entity filter is highly selective (for instance, a particular asset name such as "XYZ Corp") it will generally be more likely to provide a more efficient query by beginning the query access path from the custom object side. If, however, the entity is not filtered selectively, but a current user has access to a small amount of data, then the query optimizer should access rows in the share table 600 through the user side. Because, in the above example, a conventional database system optimizer's native statistic methods may be insufficient to make this determination, since the native statistics will aggregate across multiple tenants and will not provide context into the current tenant's data, embodiments implementing private sharing provide mechanisms and methods for improving the original query prior to the query being submitted to the database.

It is noteworthy that, because of the wide range of business types, industries, and sizes potentially served by multi-tenant database systems, the likelihood of data "skew" is greatly increased. That is, the statistical profile of the largest most complex tenants is likely to look very different from that of small or medium sized customers. The use of query "Hints" enable the ability to choose explicitly an improved query plan.

For instance, an improved SQL statement might mention the explicit order of table joins, or explicit index names to use (rather than letting the optimizer choose automatically).

Another mechanism for controlling the query plan explicitly is to re-write the query using equivalent but different SQL syntax. For instance, a single flat SQL statement can be re-S written using a nested SELECT in the FROM clause of the outer query. Joins and semi-joins are sometimes interchangeable. Anti joins can be written using the MINUS operator, etc. All of these are examples of ways in which a programmatic SQL generator can alter the behavior of the query optimizer native to an underlying database by using contextual knowledge to change the query plan.

In certain aspects, a query optimizer native to a RDBMS, may be configured or "tuned" by supplying appropriate "hints" to the native query optimizer. For example, when SQL is generated programmatically by the MTS, the tenant-level statistics are consulted and a dynamic decision is made as to the syntax of the query. As used herein the term tenant level statistics is broadly defined as statistical quantities that, though they may mirror the underlying relational database statistics in many ways (for example, in one aspect they track the total number of distinct values for indexed columns), are kept on a per-tenant basis. In one embodiment, tenant level statistics may be stored in tables in tenant database storage areas 112. Similarly for important application functionality, such as the sharing feature, the MTS tracks the approximate number of rows to which each user has access and stores such statistics (e.g., tables stored in user storage areas 114 of database 108). Then, when a filtered sharing query arrives, the dynamically generated SQL includes the appropriate hints and structure to force a query plan that is improved.

In one aspect, metadata information about users and tenants/organizations and the data contained in entity rows for that tenant are tracked (e.g., relevant information and metadata stored to separate user-level and tenant-level data tables) in order to make choices about query access paths. In an embodiment, evaluation of a sharing model controls which users can see which records. These embodiments can distinguish between users that can see many rows in an organization (e.g., bosses) versus users who can see very few rows (e.g., lower level employees).

The use of the key prefix can substantially increase the efficiency of making this determination. In a further embodiment, the joining and tracking of specialized tables is made more efficient by using tenant-level statistics. In a yet further embodiment, a sharing model is combined with a proper choice of filters, e.g. which model or filter should lead the query and how should the other filters be organized in a query plan in order to improve the efficiency of the query.

Improving The Search On Rows

In embodiments, for each user in the system, an approximate count of the number of rows that the user can see is tracked for each entity type or organization that has a sharing model. This number of rows (as a percentage of the total number of entity rows for that organization) is used as a decision point by embodiments selecting between two different query paths. It has been determined empirically that users who can see most of the entity rows (e.g., bosses) benefit from a certain query structure, whereas users who can see a small percentage of the entity rows (e.g., lower level employees) benefit from a different query structure. Conventional approaches are not able to select between the two query paths without having an entirely different SQL provided via a programmatic decision.

In aspects, a query improver reads data from multi-tenant data tables and stores metadata (e.g., number of rows accessible per tenant or per user, or other metadata) to tenant level tables or user-level tables in database 108. For example, a tenant-level metadata table might be stored to a tenant storage area 112 and a user-level table might be stored to a user storage area 114. In one aspect, the query improver includes a metadata generator that processes multi-tenant tables and produces tenant-level and user-level metadata tables, such as the tenant level metadata table 650 shown by FIG. 6. The query improver and metadata generator might execute in process space 110 or other process space. The query improver retrieves and processes the appropriate tables when preparing improved SQL queries. In other aspects, flags or tags may be implemented in the multi-tenant database tables to distinguish users and tenants.

The number of rows that are accessible by a tenant or user may be calculated based on the ownership of a row, which is tracked in column 209 of table 200. The ownership information can be entered when the row (e.g. account) is created or by other means and/or at other times depending upon implementation specific details. From this ownership data, metadata tables may be permanently created or calculated dynamically upon login of a user. Using such metadata, a user query may be improved prior to submission to an underlying database manager. If a user can see few rows, then a query may be improved by structuring the query to retrieve all of the data in those rows and then apply any desired filters to the data in the selected rows. For example, consider a query of the form: "Show me all accounts that I can see" in a private account sharing model. An example of a data model for sharing appears in FIG. 3 (middle table is sharing table, final table is the user/group "blowout" table which describes which users are contained in a group, or above a user in the role hierarchy (UG=User or Group>>. According to one aspect, for a "lower level employee" user it is typically most advantageous to join these tables starting from the right, filtering on users Id to form a temporary result of the rows that can be seen. Because the user can not see many rows, this will yield a relatively selective path. An example query follows:

```
select a.name "ACCOUNT.NAME",
from sales.account a,
    (select distinct s.account_id
    from core.ug_blowout b, sales.acc_share s
        where s.organization_id ?
        and b.organization_id ?
        and b.users id = ?
        and s.ug_id = b.ug_id
        and s.acc access level> 0) t,
    core.users u
where (t.account_id = a.account_id)
and (u.users_id = a.owner)
and (a.deleted = '0')
and (a.organization_id ?)
and (u.organization_id ?))
```

Conversely for a "boss" user who can see most of the entity records in the organization, the query improver will select another way to access the data, e.g. by applying a selective filter on all rows of the desired tenant. If the metadata gathered for a boss (done by gathering up the ownership numbers for people beneath) indicates access to many rows, it is typically most advantageous to begin the query from the left and use a nested loop query plan onto the sharing table (acc_share), an example of which follows:

```
select
    a.name "ACCOUNT. NAME" ,
from
    sales.account a, core.users u
```

```
        where (u.users_id = a.owner)
        and (a.deleted = '0')
        and (a.organization_id = ?)
        and (exists (select 1
                    from core.ug_blowout b,
                         sales.acc share s
                    where s.organization_id = ?
                    and b.organization_id = ?
                    and b.users id = ?
                    and s.ug_id = b.ug_id
                    and s.acc access level> 0
                    and s.account id = a. account id))
        and (u.organization_id = ?)
```

Note that this query in general runs in relatively constant (reasonable) time for all users in an organization. It may not be particularly fast since it must look at all top-level entity records, but it is suitable for a boss who can in fact see most records. The first "lower 1 0 level employee" query runs much faster for users who in fact can not see many records, but it may run much slower for bosses who can see all records. This, again, is why it is desirable to have an accurate decision between the two paths.

In order to keep the metadata current, the percentage of rows that each and every user can see can be tracked. In one aspect, there are three ways in which a user might gain 15 access to data in a private security model:
(1) Rows owned by the user or users below the user in the role hierarchy;
(2) Rows that are shared via sharing rules to a group to which this user belongs; and
(3) Rows that are shared via manual/team sharing to this user (possibly via a group).

In one aspect, the total number of rows for each entity type for each organization is tracked (this is useful for any of the strategies above). Also, the total number of rows owned by each user in a metadata table is tracked.

Because (1) and (2) can be important reasons for tracking why a user has access to entity records in some implementations, (this might be known empirically from how organizations use the system) the information needed to calculate the number of rows a user can see, at least approximately, can be determined from the role hierarchy metadata table 675 of FIG. 6 for example, in conjunction with the metadata table 650. These metadata tables can be used to determine the number of records owned by a user or his subordinates.

The sharing rule metadata, such as tables 600 or 650, can also be used along with the group definition metadata, such as table 625, to calculate the total number of rows visible for a given user via sharing rules. For example, tables 600 and 625 may be joined from the right so that all of the groups to which a user belongs is determined. The number of rows seen by each of these groups may then be obtained from table 650 and added together. Table 650 may be calculated from table 600 for each organization. It will be appreciated by those skilled in the art that, while these methods of determining users from metadata tables illustrated by FIG. 6 are specific to a particular tenant in a multi-tenant database, other metadata tables may be included to hold metadata for other tenants.

It is also noteworthy that, for the purpose of the heuristic decision between "boss" and "lower level employee," the sum of these two values is sufficiently close to the true value even though these two sets may overlap.

In one aspect, the use of metadata tables such as the metadata tables illustrated by FIG. 6 (which are generally much smaller than the actual entity tables which might have millions of rows) ensures that the calculation of visible rows will itself not require much time. In one aspect, the decision to use metadata tables to perform this calculation is itself cached in a user-information data structure kept by running application servers 100, e.g., with a timeout value. In this manner, even though the calculation itself may be relatively lightweight, it is only performed periodically while a user is logged in.

Besides user group ID, Table 650 could have a tenant, division, group or other type of identification. Thus, each one of the tables in an example embodiment illustrated by FIG. 15 6 may hold tenant-level, user-level, or other level metadata based on a type of identification.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. Computer programs incorporating features of the present invention may be encoded on various computer readable media for storage and/or transmission; suitable media include magnetic disk or tape, optical storage media such as compact disk (CD) or DVD (digital versatile disk), flash memory, and the like. The computer readable medium may be any combination of such storage or transmission devices. Thus, embodiments also provide methods of transmitting program code to one or more processors for implementing any of the methods mention herein.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a carrier signal carrying such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:
1. A method of controlling access to diverse custom objects in a custom entity share table, the method including:
   storing a plurality of custom object types for a plurality of shared database tenants in a custom entity share table in a memory, wherein:
      a first custom object for a first tenant has a first schema including a first set of custom fields;
      a second custom object for a second tenant has a second schema including a second set of custom fields;

the first and second custom objects are both stored in a same custom entity share table despite having different sets of custom fields; and the first and second custom objects are both associated with fields for tenant identifier (id) and object type;

receiving a user request for access to custom objects of a particular custom object type and identifying a particular group of users to which the user belongs with a particular tenant id in response to the user request; and determining whether the particular group has access to the particular custom object type requested and, responsively, accessing and returning at least some custom objects in the custom entity share table based at least on the particular tenant id and the particular custom object type to select at least some of the plurality of the custom objects responsive to the user request.

2. The method of claim 1, wherein the fields for the tenant id and object type are stored in the custom entity share table with the custom objects.

3. The method of claim 1, wherein the fields for the tenant id and object type are stored in a custom entity access table that is linked to the custom objects.

4. A system that controls access to diverse custom objects in a custom entity share table, the system including:
one or more processors coupled to memory, the memory loaded with computer instructions that, when executed on the processors, implement actions including:
storing a plurality of custom object types for a plurality of shared database tenants in a custom entity share table in a memory, wherein:
a first custom object for a first tenant has a first schema including a first set of custom fields;
a second custom object for a second tenant has a second schema including a second set of custom fields;
the first and second custom objects are both stored in a same custom entity share table despite having different sets of custom fields; and
the first and second custom objects are both associated with fields for tenant identifier (id) and object type;
receiving a user request for access to custom objects of a particular custom object type and identifying a particular group of users to which the user belongs with a particular tenant id in response to the user request; and
determining whether the particular group has access to the particular custom object type requested and, responsively, accessing and returning at least some custom objects in the custom entity share table based at least on the particular tenant id and the particular custom object type to select at least some of the plurality of the custom objects responsive to the user request.

5. The system of claim 4, wherein the fields for the tenant id and object type are stored in the custom entity share table with the custom objects.

6. The system of claim 4, wherein the fields for the tenant id and object type are stored in a custom entity access table that is linked to the custom objects.

7. A non-transitory machine-readable storage medium storing a plurality of instructions for programming one or more processors to control access to diverse custom objects in a custom entity share table, the instructions, when executed on the processors, implementing actions including:
storing a plurality of custom object types for a plurality of shared database tenants in a custom entity share table in a memory, wherein:
a first custom object for a first tenant has a first schema including a first set of custom fields;
a second custom object for a second tenant has a second schema including a second set of custom fields;
the first and second custom objects are both stored in a same custom entity share table despite having different sets of custom fields; and
the first and second custom objects are both associated with fields for tenant identifier (id) and object type;
receiving a user request for access to custom objects of a particular custom object type and identifying a particular group of users to which the user belongs with a particular tenant id in response to the user request; and
determining whether the particular group has access to the particular custom object type requested and, responsively, accessing and returning at least some custom objects in the custom entity share table based at least on the particular tenant id and the particular custom object type to select at least some of the plurality of the custom objects responsive to the user request.

8. The non-transitory computer readable medium of claim 7, wherein the fields for the tenant id and object type are stored in the custom entity share table with the custom objects.

9. The non-transitory computer readable medium of claim 7, wherein the fields for the tenant id and object type are stored in a custom entity access table that is linked to the custom objects.

10. A computer-implemented method of controlling access to custom objects in a custom entity share table, the method including:
storing a plurality of custom objects for a plurality of shared database tenants in a custom entity share table in a memory;
receiving a user request for access to the custom objects of a particular custom object type and identifying a particular group of users to which the user belongs based on a tenant identifier in response to the user request; and
determining whether the particular group has access to the particular custom object type requested, including:
when the user request is selective, accessing the custom entity share table based on the tenant identifier; and
when the user request is unselective, accessing the custom entity share table based on a user group identifier; and
responsive to the user request, returning at least some custom objects in the custom entity share table based at least on the tenant identifier or the group identifier and the particular custom object type.

11. The method of claim 10, further including storing one or more fields for the tenant identifier and particular custom object type in the custom entity share table with the custom objects.

12. The method of claim 10, further including storing one or more fields for the tenant identifier and particular custom object type in a custom entity access table that is linked to the custom objects.

13. The method of claim 10, wherein the custom objects are accessed using a key prefix.

14. A system including one or more processors coupled to memory, the memory loaded with computer instructions to control access to custom objects in a custom entity share table, the instructions, when executed on the processors, implement actions comprising:
storing a plurality of custom objects for a plurality of shared database tenants in a custom entity share table in a memory;
receiving a user request for access to the custom objects of a particular custom object type and identifying a particular group of users to which the user belongs based on a tenant identifier in response to the user request; and determining whether the particular group has access to the particular custom object type requested, including:
- when the user request is selective, accessing the custom entity share table based on the tenant identifier; and
- when the user request is unselective, accessing the custom entity share table based on a user group identifier; and responsive to the user request, returning at least some custom objects in the custom entity share table based at least on the tenant identifier or the group identifier and the particular custom object type.

15. The system of claim 14, further implementing actions storing one or more fields for the tenant identifier and particular custom object type in a custom entity access table that is linked to the custom objects.

16. The system of claim 14, wherein the custom objects are accessed using a key prefix.

17. A non-transitory computer readable storage medium impressed with computer program instructions to control access to custom objects in a custom entity share table, the instructions, when executed on the processors, implement a method comprising:

storing a plurality of custom objects for a plurality of shared database tenants in a custom entity share table in a memory;

receiving a user request for access to the custom objects of a particular custom object type and identifying a particular group of users to which the user belongs based on a tenant identifier in response to the user request; and determining whether the particular group has access to the particular custom object type requested, including:
- when the user request is selective, accessing the custom entity share table based on the tenant identifier; and
- when the user request is unselective, accessing the custom entity share table based on a user group identifier; and responsive to the user request, returning at least some custom objects in the custom entity share table based at least on the tenant identifier or the group identifier and the particular custom object type.

18. The non-transitory computer readable storage medium of claim 17, implementing the method further comprising storing one or more fields for the tenant identifier and particular custom object type in a custom entity access table that is linked to the custom objects.

19. The non-transitory computer readable storage medium of claim 17, wherein the custom objects are accessed using a key prefix.

* * * * *